8324X
X8324
R. RICH.
Running-Gear.
Patented July 22, 1834.
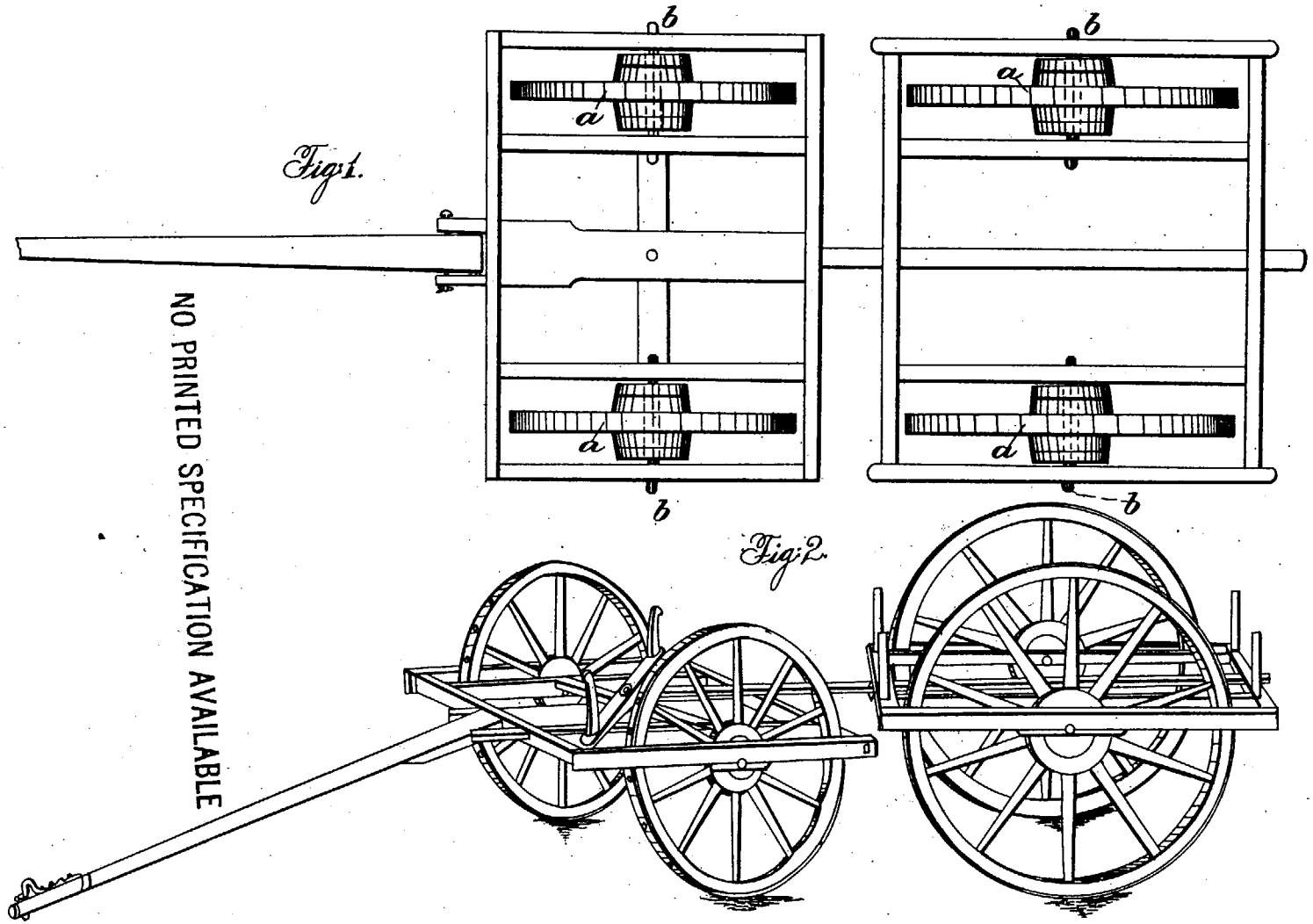
NO PRINTED SPECIFICATION AVAILABLE July 22 1834

8324X

Reuben Rich
Letters Patent

The schedule referred to in these Letters Patent and making part of the same containing a description in the words of the said Reuben Rich himself of his improvement in the making or manufacturing of waggons or any kind of Wheel Carriages

---

To all persons to whom these presents shall come. Reuben Rich of the Town of Albion County of Oswego and State of New York send greeting. Be it known that I the said Reuben Rich have invented a new and useful improvement not known or used before in the making or manufacturing of waggons or any kind of Wheel Carriages which invention and the manner of using it is as follows. This improvement in waggons or any kind of wheel carriages, the wheels are the same as common carriages except the hubs and the axle in the hubs. The axle in the hubs is a bar of iron through the hubs with the ends made round, sticking out of the hubs about 2 or three inches or as the case may be, these axles made permanent in the hubs and revolve round with the wheels. and the frame is explained in the drawing, so it needs no farther explanation about it &c &c. In witness whereof I have hereunto subscribed my name the 10th day of June 1834

Reuben Rich

Witnesses
J. Waldron
P. R. Rich

Exd
[illegible]

260 words (Patented 22 July 1834)

Drawing

[illegible]